June 13, 1950
KUAN-HAN SUN ET AL
2,511,226
FLUOPHOSPHATE GLASS
Filed March 26, 1947
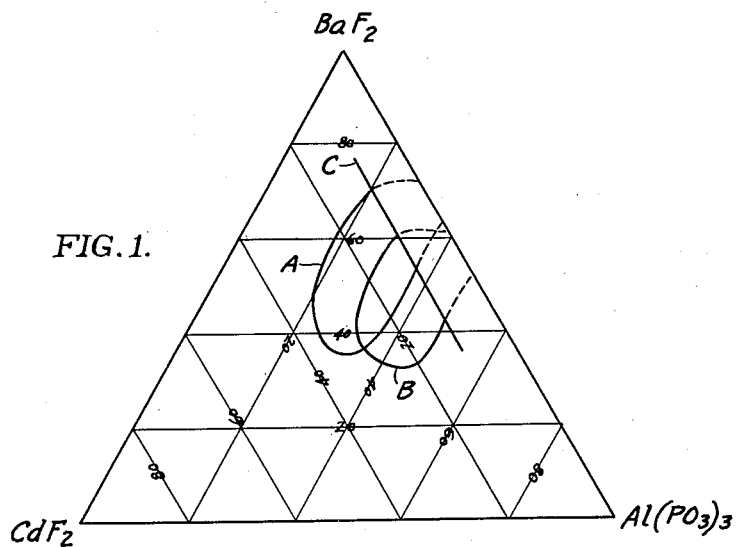
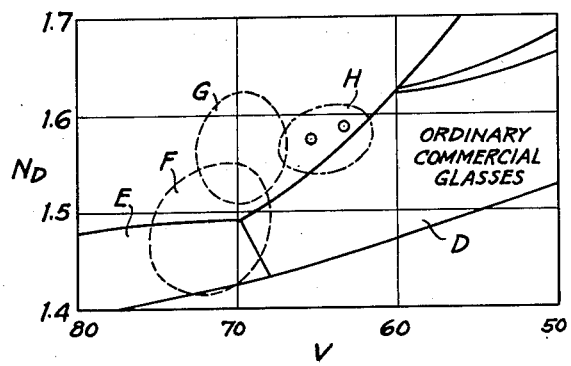
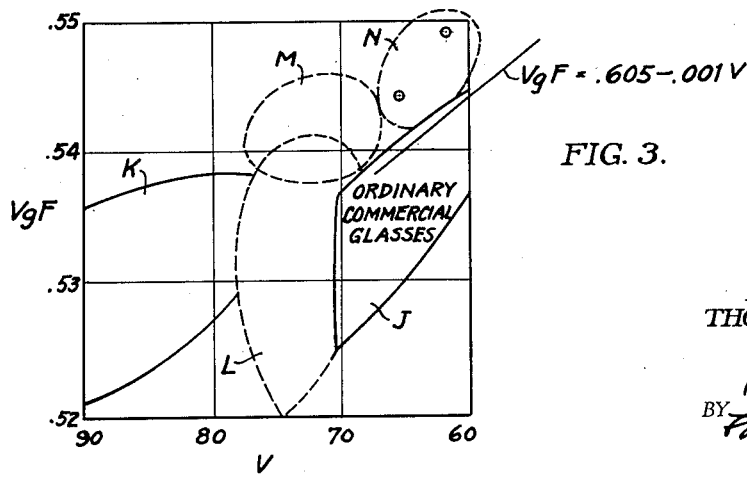
KUAN-HAN SUN
THOMAS E. CALLEAR
INVENTORS
BY
ATTORNEY & AGENT Patented June 13, 1950

2,511,226

UNITED STATES PATENT OFFICE 2,511,226

FLUOPHOSPHATE GLASS

Kuan-Han Sun, Pittsburgh, Pa., and Thomas E. Callear, Rochester, N. Y., assignors to Eastman Kodak Company, Rochester, N. Y., a corporation of New Jersey Application March 26, 1947, Serial No. 737,340

4 Claims. (Cl. 106—47)

This invention relates to optical glasses and to the batch from which optical glass is made. It relates particularly to fluophosphate glasses of the type described in the copending application, Serial Number 644,179, filed January 29, 1946, by one of us (Sun), which type of glass contained little or no alkali metal.

In common with all glass manufacturing inventions one object of the present invention is to produce an optical glass capable of being manufactured and having physical characteristics compatible with the operations used in the manufacture of lenses, and with the conditions to which lenses are subjected. Furthermore, there is the constant desire of all lens designers to have at their disposal glasses with optical properties covering as wide a range as possible. The provision of a glass with novel optical properties is also a general object of the present invention.

Particularly, however, the object of the invention is to provide a glass having a higher partial dispersion in the blue region of the spectrum than the previous glasses of equal Abbé value.

According to the invention the above objects are obtained by modifying the alkali-metal-free fluophosphate glasses of the above mentioned copending application by the addition of cadmium fluoride to the batch. If only a trace of cadmium is added, the effect is negligible and therefore, we prefer to add to the batch a mole percentage of cadmium fluoride between 10 and 35 per cent. This shifts the index of refraction into a region between 1.55 and 1.61 with the Abbé value between 60 and 68. That is, it brings the Abbé value down below 68 as compared with Sun's prior alkali-metal-free fluophosphate glasses. In this region of Abbé values, prior partial dispersions $V_{gF}$ are below $(0.605-0.001V)$ where V is the Abbé value. The addition of cadmium raises this partial dispersion value above 0.543 and up to 0.55 or even higher. For the sake of definiteness, we specify an upper limit of 0.56. A more exact way of setting the lower limit of the partial dispersion obtained by the present invention would be by the equation $$V_{gF} = .605 - .001V$$

Throughout this specification the Abbé value is represented by $$V = \frac{N_D - 1}{N_F - N_C}$$

The blue partial dispersion $V_{gF}$ represents the function $$\frac{N_g - N_F}{N_F - N_C}$$

where N is the index of refraction for the spectrum line indicated by the accompanying subscript.

In the accompanying drawings:

Fig. 1 is a composition diagram showing the percentage of three constituents of the batch.

Fig. 2 illustrates the effect of the invention on the index of refraction and the Abbé value.

Fig. 3 shows the effect of the invention on the blue partial dispersion.

In Fig. 1 the relative percentages of barium fluoride, cadmium fluoride and aluminum metaphosphate are shown both in mole percentages, by the area surrounded by the curve A and in weight percentages, by the area surrounded by the curve B. The line C is drawn to represent the minimum percentage of 10 per cent for the cadmium fluoride content, since at least this amount is required to obtain a useful degree of the effect produced by the present invention. Satisfactory glasses can be made within the area represented by these curves.

Two such glasses which have proven to be satisfactory to manufacture have the following composition:

|  | Example 1 | | Example 2 | |
|---|---|---|---|---|
|  | Weight | Mole | Weight | Mole |
|  | Per cent | Per cent | Per cent | Per cent |
| $CdF_2$ | 11.8 | 15 | 23.7 | 30 |
| $BaF_2$ | 57.8 | 63 | 41.5 | 45 |
| $Al(PO_3)_3$ | 30.4 | 22 | 34.8 | 25 |
| $N_D$ | 1.5766 | | 1.5959 | |
| V | 66.1 | | 62.8 | |
| $V_{gF}$ | .544 | | .549 | |

In either example, the batch which should be dry and powdered is melted at about 1000° C., preferably in a platinum crucible with no reduction allowed. The liquid glass can withstand stirring and shaking and may be poured into a mold; preferably the mold should be previously heated to a temperature between 300 and 400° C. A clear glass results after the material is cooled down slowly to room temperature.

In Fig. 2 the above index of refraction $N_D$ and Abbé value V are plotted in the area H. It will be noted that this area differs from that of ordinary commercial glasses area D and also from fluoride glasses represented by area E and the fluophosphate glasses of the copending applications 644,178, now Patent No. 2,481,700, September 13, 1949, area F, and 644,179, area G.

In Fig. 3 the same comparisons are made with respect to the blue partial dispersion, J representing the area of ordinary commercial glasses, K the area of fluoride glasses, L the area of fluophosphate glasses, Serial No. 644,178, now Patent No. 2,481,700, September 13, 1949, M the area of alkali-free fluophosphate glasses, Serial Number 644,179, and N the area of the present invention. The approximate limit represented by the equation $V_{gF}=.605-.001V$ is drawn on Fig. 3.

From Fig. 1 it is noted that the mole percentages all fall within the range specified in the parent application Serial Number 644,179. That is, the mole percentage of barium fluoride is between 35 and 71 percent, that of aluminum metaphosphate is between 14 and 35 percent and there is no alkali metal fluoride present although quantities up to 4 percent would be harmless. The cadmium fluoride added according to the present invention must be between 10 and 35 mole percent and if any other materials are also added, the total mole percent for the barium fluoride, aluminum phosphate and cadmium fluoride must total at least 60 per cent. Similarly the atomic ratio of fluorine to phosphorus is within the range 0.4 and 6.5 required by the parent application.

The invention is not limited to these details, but is of the scope of the appended claims.

We claim:

1. A fluophosphate optical glass consisting of the fused heat reaction product of a batch consisting of compatible materials and containing in mole proportion barium fluoride 35 to 71 percent, aluminum metaphosphate 14 to 35 percent, and cadmium fluoride 10 to 35 percent the total mole percent of barium fluoride, aluminum phosphate and cadmium fluoride being at least 60 and said glass having a partial dispersion ratio $(N_g-N_F)/(N_F-N_C)$ greater than $(0.605-0.001V)$ and less than 0.56 where each $N$ is the refractive index for the spectrum line indicated by the adjoined subscript and $V$ is the Abbé value.

2. An alkali-metal-free fluophosphate optical glass of the type consisting of the fused heat reaction product of a batch containing in mole proportions, as predominant and essential ingredients, barium fluoride, 35 to 71 percent; aluminum metaphosphate, 14 to 35 per cent; the remainder being materials compatible in a glass composition, characterized by the presence of 10 to 35 mole per cent of cadmium fluoride.

3. A fluophosphate optical glass consisting of the fused heat reaction product of a batch consisting of metal fluorides and at least one metal phosphate all mutually compatible in glass compositions, said batch containing in mole proportion barium fluoride 35 to 71 per cent, aluminum metaphosphate 14 to 35 per cent, cadmium fluoride 10 to 35 per cent, the total of these three ingredients being 60 to 100 per cent.

4. A fluophosphate optical glass consisting of the fused heat reaction product of a batch consisting of barium fluoride 35 to 71 mole per cent, aluminum metaphosphate 14 to 35 mole per cent, and cadmium fluoride 10 to 35 mole per cent.

KUAN-HAN SUN.
THOMAS E. CALLEAR.

REFERENCES CITED

The following references are of record in the file of this patent:

UNITED STATES PATENTS

| Number | Name | Date |
| --- | --- | --- |
| 2,278,501 | Tillyer et al. | Apr. 7, 1942 |
| 2,430,539 | Kuan-Han Sun | Nov. 11, 1947 |
| 2,430,540 | Kuan-Han Sun et al. | Nov. 11, 1947 |